US011980915B2

(12) United States Patent
Park et al.

(10) Patent No.: US 11,980,915 B2
(45) Date of Patent: May 14, 2024

(54) ULTRASONIC TRANSMISSION STRUCTURE

(71) Applicants: CENTER FOR ADVANCED META-MATERIALS, Daejeon (KR); PUSAN NATIONAL UNIVERSITY INDUSTRY-UNIVERSITY COOPERATION FOUNDATION, Busan (KR)

(72) Inventors: Jong Jin Park, Sejong-si (KR); Jun Hyuk Kwak, Sejong-si (KR); Kyung Jun Song, Busan (KR); Hak Joo Lee, Daejeon (KR)

(73) Assignees: CENTER FOR ADVANCED META-MATERIALS, Daejeon (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 268 days.

(21) Appl. No.: 17/741,515

(22) Filed: May 11, 2022

(65) Prior Publication Data

US 2022/0266300 A1 Aug. 25, 2022

Related U.S. Application Data

(63) Continuation of application No. PCT/KR2019/015302, filed on Nov. 12, 2019.

(30) Foreign Application Priority Data

Nov. 11, 2019 (KR) ........................ 10-2019-0143826

(51) Int. Cl.
*B06B 3/02* (2006.01)
*B06B 3/04* (2006.01)

(52) U.S. Cl.
CPC . *B06B 3/02* (2013.01); *B06B 3/04* (2013.01)

(58) Field of Classification Search
CPC .................................... B06B 3/02; B06B 3/04
(Continued)

(56) References Cited

U.S. PATENT DOCUMENTS 4,276,780 A * 7/1981 Patel .................. G01N 29/2431 356/432
11,883,847 B2 * 1/2024 Buckland ............... G10K 11/02
(Continued)

FOREIGN PATENT DOCUMENTS

JP 11-156298 A 6/1999
JP 2000-050392 A 2/2000
(Continued)

OTHER PUBLICATIONS

International Search Report for PCT/KR2019/015302 mailed Aug. 7, 2020 from Korean Intellectual Property Office.

*Primary Examiner* — Rashad H Johnson
(74) *Attorney, Agent, or Firm* — Revolution IP, PLLC

(57) ABSTRACT

Disclosed is an ultrasonic wave transmission structure which is provided on a path of ultrasonic waves to amplify incident ultrasonic waves. The ultrasonic wave transmission structure includes: multiple rings each provided with a body portion having a different radius from other body portions and spaced apart from another body portion adjacent thereto and a slit disposed between adjacent body portions; and a membrane disposed in the multiple rings, wherein the mass of the membrane is adjusted to vary a resonant frequency in multiple sub-membrane regions.

16 Claims, 5 Drawing Sheets

(58) Field of Classification Search
USPC ........................................................ 310/300
See application file for complete search history.

(56) References Cited

U.S. PATENT DOCUMENTS

| | | | | |
|---|---|---|---|---|
| 2007/0195976 | A1* | 8/2007 | Sekino | H04R 19/013 381/191 |
| 2009/0306510 | A1* | 12/2009 | Hashiba | G01S 7/52095 600/447 |
| 2013/0310693 | A1* | 11/2013 | Tsuruno | B06B 1/0629 600/459 |
| 2019/0160491 | A1* | 5/2019 | Biateau | B06B 1/0292 |
| 2021/0086230 | A1* | 3/2021 | Hur | G10K 11/04 |
| 2021/0366458 | A1* | 11/2021 | Hyun | G10K 11/30 |
| 2022/0218308 | A1* | 7/2022 | Oh | A61B 8/4477 |
| 2022/0266300 | A1* | 8/2022 | Park | B06B 3/02 |
| 2022/0268742 | A1* | 8/2022 | Kwak | G01N 29/28 |

FOREIGN PATENT DOCUMENTS

| | | | |
|---|---|---|---|
| JP | 2001-301156 | A | 10/2001 |
| JP | 2006-173770 | A | 6/2006 |
| KR | 10-2016-0023154 | A | 3/2016 |
| KR | 10-2018-0096848 | A | 8/2018 |

* cited by examiner

【FIG. 1】
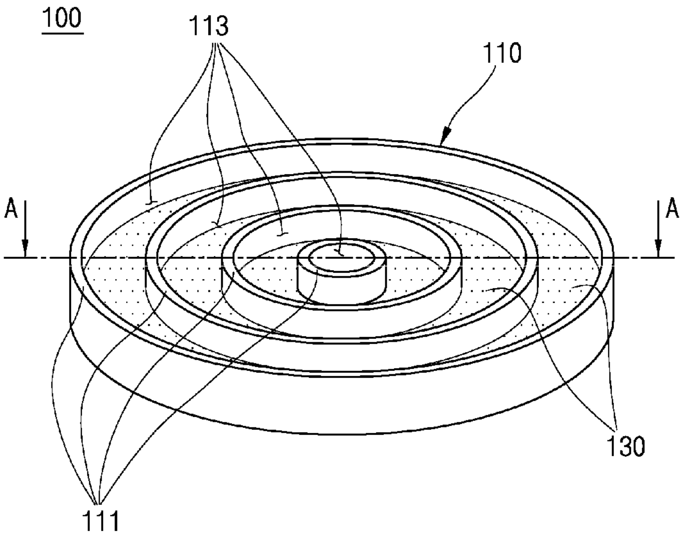
【FIG. 2】
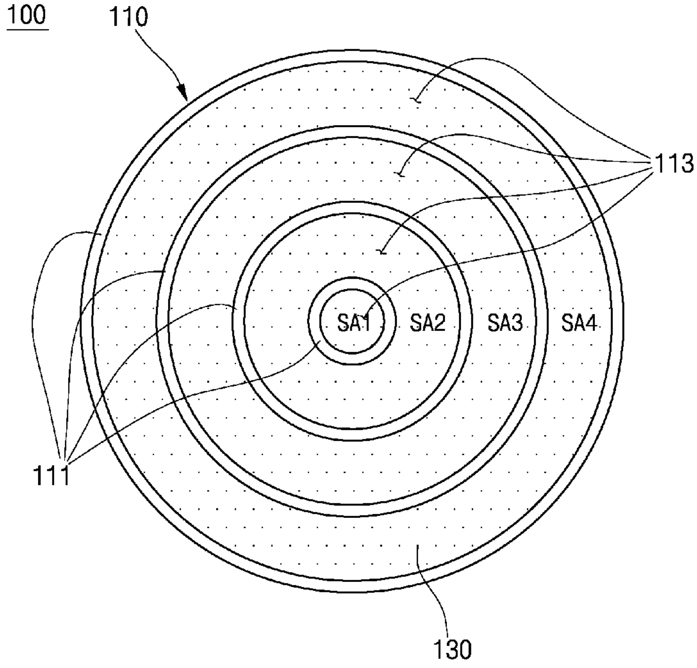

【FIG. 3】
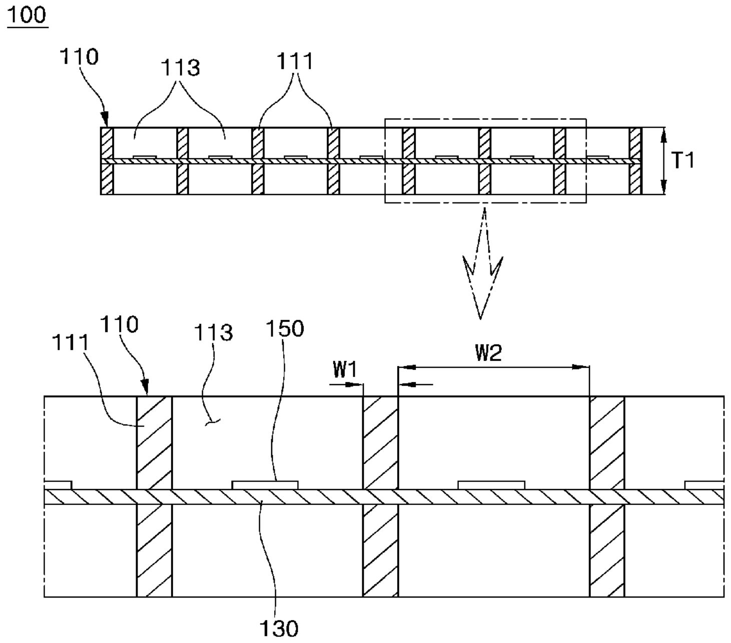
【FIG. 4】
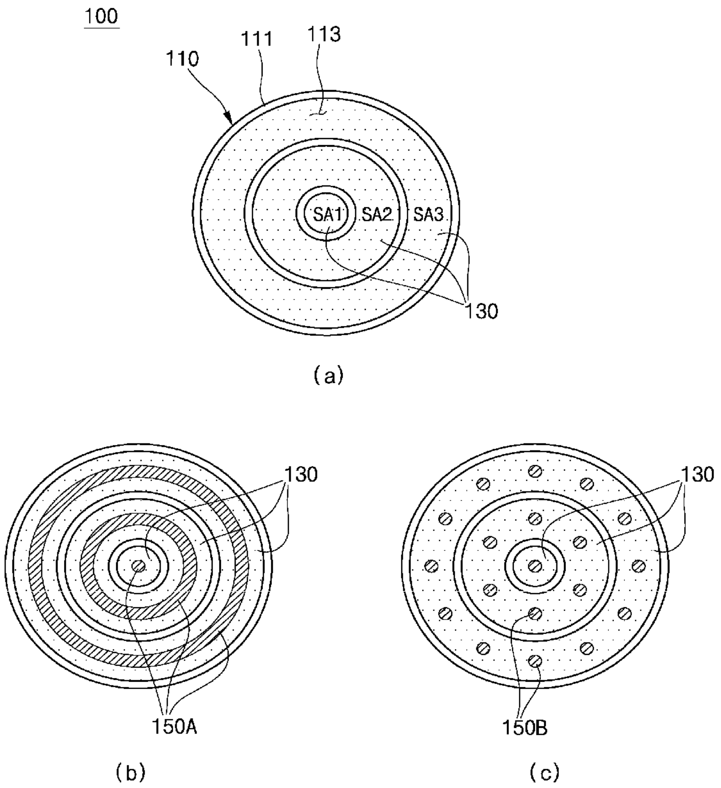

【FIG. 5】
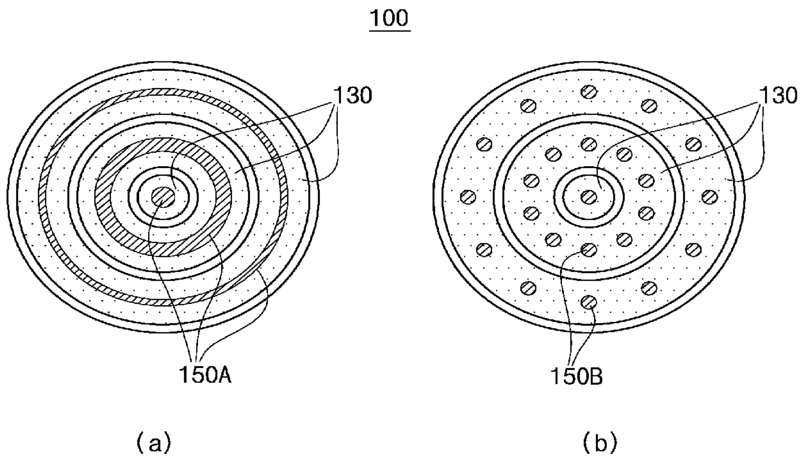
【FIG. 6】
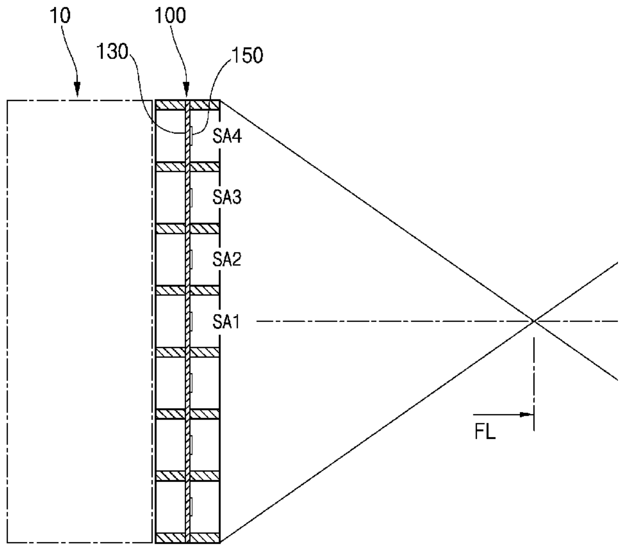
【FIG. 7】
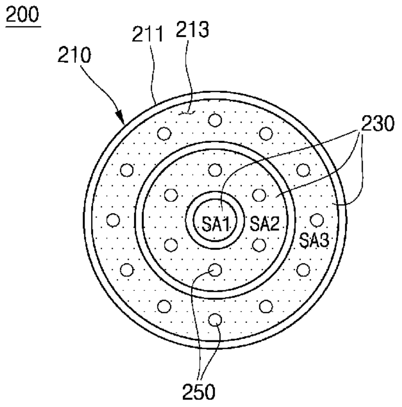

【FIG. 8】
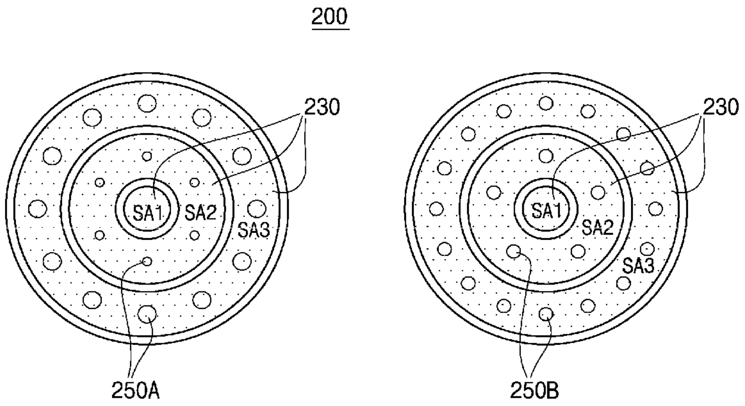
(a) (b)
【FIG. 9】
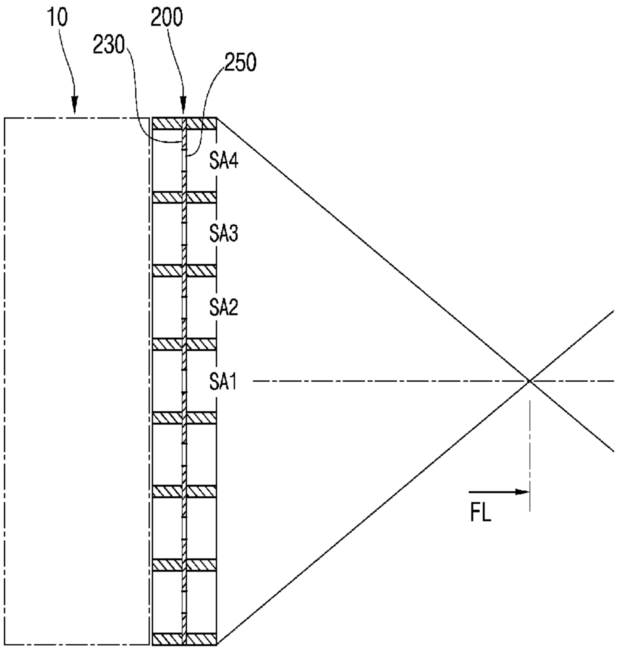

【FIG. 10】
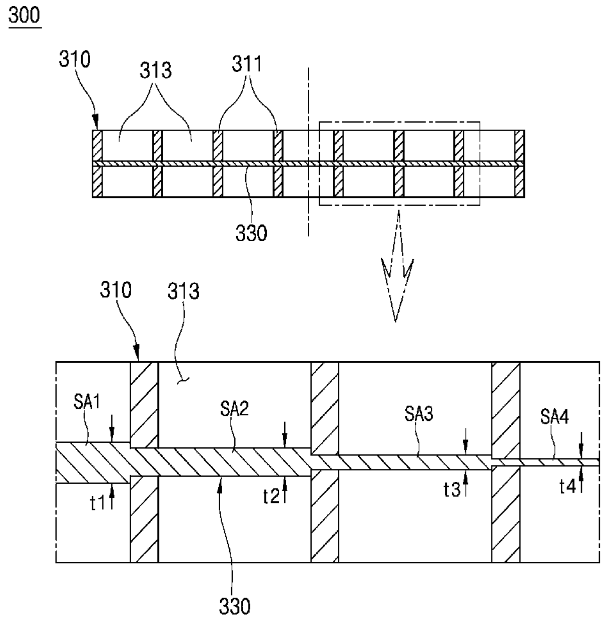

ULTRASONIC TRANSMISSION STRUCTURE

TECHNICAL FIELD

The present invention relates to an ultrasonic wave transmission structure, particularly to an ultrasonic wave transmission structure capable of amplifying ultrasonic waves.

BACKGROUND ART

An ultrasonic wave or ultrasound means periodic acoustic pressure having frequencies exceeding the maximum human audible range and corresponds to a sound wave above a frequency of about 20 kHz (20,000 Hz).

Ultrasound is generally used in various fields, such as penetration of media, measurement of echo waves, supply of concentrated energy, and the like. For example, an ultrasound examination apparatus emits ultrasonic waves to a subject, such as a person, an animal, an object, and the like, detects an ultrasound signal reflected from the subject, and displays a tomographic image of tissue in the subject on a monitor to provide information necessary for examination of the subject.

A device adapted to oscillate or receive ultrasonic waves is referred to as an ultrasonic transducer and a series of transducer assemblies brought into contact with a subject including such an ultrasonic transducer may be referred to as a probe.

Propagation of ultrasound is realized by energy transfer through a medium. When the ultrasound passes through a certain medium, the ultrasound is affected by intrinsic acoustic impedance of the medium. For example, the ultrasound is relatively poorly transmitted in air and is transmitted well in liquids or solids. An examination apparatus using ultrasound may be classified into a contact type and a non-contact type based on a corresponding medium.

Contact type ultrasound examination uses a liquid or a solid as a medium and is generally used due to good transmission output of ultrasonic waves, as described above. However, since contact type ultrasound examination is performed by placing the liquid or solid in a space between a probe and a subject, the subject is frequently exposed to the liquid or solid and it is difficult to apply contact type ultrasound examination when a fine roughness or a porous tissue is present on a surface of the subject.

Non-contact type ultrasound examination uses air as a medium and allows non-contact examination without direct contact with a subject. Thus, non-contact type ultrasound examination prevents contamination of the subject, can be effectively used even when the fine roughness or the porous tissue is present on the surface of the subject, and can be broadly used in the field of non-destructive examination of composite materials used in aviation, space, building materials, and the like. However, non-contact type ultrasound examination does not allow sufficient penetration of a large quantity of acoustic wave energy into a material due to a difference in acoustic impedance between air and a target material, as compared to contact type ultrasound examination. That is, the non-contact type ultrasound examination provides an ultrasound signal having lower power or a lower signal-to-noise ratio than the contact type ultrasound examination. Thus, for improvement in performance of the non-contact type ultrasound examination, there is a need for amplification of an ultrasound signal received by or transmitted from the probe.

In general, in use of ultrasound signals for detection of target materials, although the output ultrasound signals is not significantly required to have directivity, there is a need for directivity of the ultrasound signals for improvement in resolution upon reception of the ultrasound signals.

In order to realize such a directional probe, a separate acoustic lens is used to collect ultrasonic waves near a focal point when the ultrasonic waves are radiated from the ultrasonic transducer. Such an acoustic lens has a radiation surface concave towards an incident surface thereof and having a predetermined radius of curvature. Such an acoustic lens has a problem of restriction in selection of materials for the corresponding acoustic lens due to a difference in acoustic impedance between the ultrasonic transducer and a medium and a spherical acoustic lens is disadvantageous in terms of reduction in weight and size due to a large thickness caused by the radius of curvature thereof.

Korean Patent Laid-open Publication No. 2016-0023154 (Publication date: 2016 Mar. 3) discloses an ultrasonic transducer capable of improving output and input sensitivity of ultrasonic waves.

DISCLOSURE

Technical Problem

Embodiments of the present invention are conceived to solve such problems in the art and it is an object of the present invention to provide an ultrasonic wave transmission structure capable of easily changing a frequency of ultrasonic waves so as to have a resonant frequency coincident with an operation frequency of incident ultrasonic waves while amplifying the ultrasonic waves.

Technical Solution

In accordance with one embodiment, an ultrasonic wave transmission structure includes: multiple rings each provided with a body portion having a different radius from other body portions and spaced apart from another body portion adjacent thereto and a slit disposed between adjacent body portions; a membrane disposed in the multiple rings; and a mass increasing portion coupled to a membrane region adjoining the slit to increase a mass of the membrane, wherein a resonant frequency of the membrane is changed by changing a total mass of the membrane and the mass increasing portion.

In the ultrasonic wave transmission structure, the mass increasing portion may be disposed in a loop shape corresponding to a shape of the ring or may be disposed in a circular shape or a polygonal shape.

In the ultrasonic wave transmission structure, a membrane region adjoining the slit may be divided into multiple sub-membrane regions depending upon a distance from a center of the multiple rings and the total mass per area may be the same in the sub-membrane regions.

In the ultrasonic wave transmission structure, a membrane region adjoining the slit may be divided into multiple sub-membrane regions depending upon a distance from a center of the multiple rings and the total mass per area in the sub-membrane regions may be sequentially changed from the center of the multiple rings.

In the ultrasonic wave transmission structure, a focusing distance of radiated ultrasonic waves may be adjusted by adjusting a total mass difference corresponding to a difference between the total mass in a sub-membrane region disposed at the center of the multiple rings and the total mass in a sub-membrane region disposed at a periphery of the multiple rings.

In the ultrasonic wave transmission structure, the focusing distance may be decreased when the total mass difference is relatively large and the focusing distance may be increased when the total mass difference is relatively small.

In accordance with another embodiment, an ultrasonic wave transmission structure includes: multiple rings each provided with a body portion having a different radius from other body portions and spaced apart from another body portion adjacent thereto and a slit disposed between adjacent body portions; a membrane disposed in the multiple rings; and a mass decreasing portion formed in a membrane region adjoining the slit to decrease a mass of the membrane, wherein a resonant frequency of the membrane is changed by changing a total mass of the membrane and the mass decreasing portion.

In the ultrasonic wave transmission structure, the mass decreasing portion may be disposed in a hole shape penetrating the membrane.

In the ultrasonic wave transmission structure, a membrane region adjoining the slit may be divided into multiple sub-membrane regions depending upon a distance from a center of the multiple rings and the total mass per area may be the same in the sub-membrane regions.

In the ultrasonic wave transmission structure, a membrane region adjoining the slit may be divided into multiple sub-membrane regions depending upon a distance from a center of the multiple rings and the total mass per area in the sub-membrane regions may be sequentially changed from the center of the multiple rings.

In the ultrasonic wave transmission structure, a focusing distance of radiated ultrasonic waves may be adjusted by adjusting a total mass difference corresponding to a difference between the total mass in a sub-membrane region disposed at the center of the multiple rings and the total mass in a sub-membrane region disposed at a periphery of the multiple rings.

In the ultrasonic wave transmission structure, the focusing distance may be decreased when the total mass difference is relatively large and the focusing distance may be increased when the total mass difference is relatively small.

In accordance with a further embodiment, an ultrasonic wave transmission structure includes: multiple rings each provided with a body portion having a different radius from other body portions and spaced apart from another body portion adjacent thereto and a slit disposed between adjacent body portions; and a membrane disposed in the multiple rings, wherein a membrane region adjoining the slit may be divided into multiple sub-membrane regions depending upon a distance from a center of the multiple rings and a resonant frequency in the sub-membrane regions is changed by changing thicknesses of the sub-membrane regions depending upon the distance from the center of the multiple rings.

In the ultrasonic wave transmission structure, the sub-membrane regions may be formed to thicknesses sequentially changed from the center of the multiple rings.

In the ultrasonic wave transmission structure, a focusing distance of radiated ultrasonic waves may be adjusted by adjusting a thickness difference corresponding to a difference in thickness between a sub-membrane region disposed at the center of the multiple rings and a sub-membrane region disposed at a periphery of the multiple rings.

In the ultrasonic wave transmission structure, the focusing distance may be decreased when the thickness difference is relatively large and the focusing distance may be increased when the thickness difference is relatively small.

Advantageous Effects

According to the present invention, the ultrasonic wave transmission structure can effectively amplify ultrasonic waves radiated from or received by an ultrasonic transducer.

According to the present invention, since the ultrasonic wave transmission structure can suitably change the frequency so as to have a resonant frequency coincident with an operation frequency of incident ultrasonic waves, the ultrasonic wave transmission structure has good compatibility with ultrasonic transducers having various operation frequencies and can transmit or receive high power ultrasonic waves without change of specifications of an existing ultrasonic transducer, thereby enabling implementation of a high power transducer assembly.

According to the present invention, the ultrasonic wave transmission structure can satisfy high power when applied to an ultrasonic transducer having relatively small size and power, thereby enabling reduction in weight and size of the transducer assembly.

According to the present invention, the ultrasonic wave transmission structure facilitates design of a ring structure so as to have a resonant frequency coincident with an operation frequency of incident ultrasonic waves and design of a target resonant frequency through change in mass of a membrane.

According to the present invention, the ultrasonic wave transmission structure allows a focusing distance and diameter of radiated ultrasonic waves to be freely adjusted in various ways through change in mass of the membrane.

DESCRIPTION OF DRAWINGS

FIG. 1 is an exemplary perspective view of an ultrasonic wave transmission structure according to a first embodiment of the present invention.

FIG. 2 is an exemplary plan view of the ultrasonic wave transmission structure shown in FIG. 1.

FIG. 3 is an exemplary sectional view taken along line A-A of FIG. 1.

FIG. 4 is exemplary plan views of the ultrasonic wave transmission structure according to the first embodiment of the present invention.

FIG. 5 is an exemplary plan view of modification of a mass increasing portion of the ultrasonic wave transmission structure according to the first embodiment of the present invention.

FIG. 6 is an exemplary view illustrating a focusing principle of the ultrasonic wave transmission structure according to the first embodiment of the present invention.

FIG. 7 is an exemplary plane view of an ultrasonic wave transmission structure according to a second embodiment of the present invention.

FIG. 8 is an exemplary plane view of modification of a mass decreasing portion according to the second embodiment of the present invention.

FIG. 9 is an exemplary view illustrating a focusing principle of the ultrasonic wave transmission structure according to the second embodiment of the present invention.

FIG. 10 is an exemplary sectional view of an ultrasonic wave transmission structure according to a third embodiment of the present invention.

MODE FOR INVENTION

Hereinafter, preferred embodiments of the present invention will be described with reference to the accompanying drawings. In description of the embodiments, the same components will be denoted by the same terms and the same reference numerals and repeated description thereof will be omitted.

FIG. 1 is an exemplary perspective view of an ultrasonic wave transmission structure according to a first embodiment of the present invention, FIG. 2 is an exemplary plan view of the ultrasonic wave transmission structure shown in FIG. 1, and FIG. 3 is an exemplary sectional view taken along line A-A of FIG. 1.

Referring to FIG. 1 to FIG. 3, the ultrasonic wave transmission structure 100 according to the first embodiment may be provided in a plate shape having a passage formed through opposite surfaces thereof to allow ultrasonic waves to pass therethrough.

The ultrasonic wave transmission structure 100 may be formed to have a resonant frequency coincident with an operation frequency of the ultrasonic wave. When a specific operation frequency is incident on one surface of the ultrasonic wave transmission structure 100, resonance occurs in the ultrasonic wave transmission structure 100, whereby the ultrasonic waves having improved power can be radiated from the other surface of the ultrasonic wave transmission structure 100 after amplification of the ultrasonic waves therein.

Resonance refers to a phenomenon in which energy increases together with the amplitude of an ultrasonic wave in a subject having a specific frequency when an external force having the same frequency as that of the subject is applied to the subject. When an operation frequency of the ultrasonic wave is coincident with the resonant frequency of the ultrasonic wave transmission structure 100 and the ultrasonic wave is continuously generated from an ultrasound source, the ultrasonic wave can be amplified into an ultrasonic wave with high intensity in an interior passage of the ultrasonic wave transmission structure 100.

Hereinafter, the ultrasonic wave transmission structure 100 according to the first embodiment will be described in more detail.

The ultrasonic wave transmission structure 100 according to the first embodiment may include multiple rings 110, a membrane 130, and a mass increasing portion 150.

Each of the rings 110 may have a body portion 111, which has a concentric axis and a different radius from other body portions. Accordingly, a slit 113 may be formed between adjacent body portions 111. The slits 113 may be paths through which ultrasonic waves pass.

The body portions 111 may have a first width W1 and the slits 113 may have a second width W2. That is, adjacent body portions 111 may be spaced apart from each other by a distance corresponding to the second width W2.

The multiple body portions 111 may have the same first thickness T1. Accordingly, the multiple slits 113 may also have the same first thickness T1.

As shown in the drawings, the body portions 111 and the slits 113 may be formed in a circular ring shape 110. Alternatively, the body portions 111 and the slits 113 may be formed in a tetragonal ring shape.

The membrane 130 may be provided to the multiple rings 110 to amplify the received ultrasonic wave together with the multiple rings 110.

The membrane 130 may be formed in a shape corresponding to the slits 113 so as to adjoin each of the slits 113. That is, the membrane 130 may have multiple sub-membrane regions SA1, SA2, SA3, SA4, . . . , SAn having different radii corresponding to shapes of the slits 113.

Referring to FIG. 3, the membrane 130 may be provided in the form of a single plate and may be disposed to intersect the body portions 111 and the slits 113. Accordingly, the membrane 130 may have the multiple sub-membrane regions SA1, SA2, SA3, SA4, . . . , SAn adjoining the slits 113, respectively.

Although not shown in the drawings, the membrane 130 may be provided in a ring shape corresponding to the shapes of the slits 113 and may have inner and outer peripheries having a ring shape and coupled to adjacent body portions 111, respectively. Accordingly, the membrane 130 may have the multiple sub-membrane regions SA1, SA2, SA3, SA4, . . . , SAn adjoining the slits 113, respectively.

The membrane 130 may be disposed at a central portion or at one side in a thickness direction of the body portions 111 and the slits 113. For example, the membrane 130 may be disposed on one surface (lower surface in FIG. 3) or the other (upper surface in FIG. 3) of the multiple rings 110 which the ultrasonic wave enters.

The membrane 130 may be realized by a lightweight flexible film, such as a thin film and the like, or a metal sheet, for example, aluminum, stainless steel, copper, and the like. Alternatively, the membrane 130 may be realized by a polymer sheet, such as polyvinyl chloride (PVC) and the like. As such, the membrane 130 may be formed of various materials without being limited to a particular material.

As such, the membrane 130 disposed on the slits 113 through which the ultrasonic wave passes may further increase the amplitude of the ultrasonic wave incident on one surface of the multiple rings 110 such that the ultrasonic wave having an increased amplitude can be radiated from the other surface of the multiple rings 110.

For the ultrasonic wave transmission structure according to this embodiment, the structure of the multiple rings 110 is first manufactured by setting the second width W2 and the first thickness T1 of the slits 113 based on an operation frequency of an incident ultrasonic wave and a wavelength of the ultrasonic wave in a medium. Thereafter, the operation frequency of the ultrasonic wave transmission structure 100 may be adjusted by changing the mass of the membrane 130. That is, the operation frequency of the ultrasonic wave transmission structure 100 may be easily set by changing the mass of the membrane 130.

FIG. 4 is exemplary plan views of the ultrasonic wave transmission structure according to the first embodiment, in which (a) shows the membrane without showing the mass increasing portion, (b) shows a ring-shaped mass increasing portion, and (c) shows a spot-shaped mass increasing portion.

Referring to FIG. 3 and FIG. 4, the mass increasing portion 150 serves to increase the mass of the membrane 130 and may be disposed in a region of the membrane 130 adjoining each of the slits 113. That is, the mass increasing portion 150 may be disposed in each of the sub-membrane regions SA1, SA2, SA3.

The mass increasing portion 150 may be formed of a different material from the membrane 130 or the same material as the membrane 130.

Although FIG. 3 shows the mass increasing portion 150 attached to one surface (upper surface) of the membrane 130, it should be understood that the present invention is not limited thereto. That is, the mass increasing portion 150 may be attached to the surface of the membrane 130 or may be buried in the surface of the membrane 130.

The mass increasing portion 150 may be provided in various shapes on the membrane 130.

By way of example, as shown in FIG. 4 (*b*), the mass increasing portion 150 may be realized by a mass increasing portion 150A having a loop shape corresponding to the shapes of the rings 110. The mass increasing portion 150A having a loop shape may be disposed on a central line in a radial direction of each of the sub-membrane regions SA1, SA2, SA3. Alternatively, although not shown in the drawings, the loop-shaped mass increasing portion 150A may be provided in plural in the radial direction of each of the sub-membrane regions SA1, SA2, SA3 so as to be separated a preset distance from each other in the radial direction of each of the sub-membrane regions SA1, SA2, SA3.

In another example, as shown in FIG. 4 (*c*), the mass increasing portion 150 may be realized by a mass increasing portion 150B having a spot shape. The spot-shaped mass increasing portion 150B may be provided in plural in a circumferential direction of each of the sub-membrane regions SA1, SA2, SA3 so as to be separated a preset distance from each other in the circumferential direction of the sub-membrane regions SA1, SA2, SA3. Alternatively, the spot-shaped mass increasing portion 150B may be provided in plural in the radial direction of each of the sub-membrane regions SA1, SA2, SA3 so as to be separated a preset distance from each other in the radial direction of each of the sub-membrane regions SA1, SA2, SA3. In addition, the spot-shaped mass increasing portion 150B may be provided in a circular shape or a polygonal shape.

By the mass increasing portion 150, the mass of each of the sub-membrane regions SA1, SA2, SA3 may be changed (increased). As a result, the resonant frequency in each of the sub-membrane regions SA1, SA2, SA3 may be changed.

As shown in FIGS. 4 (*b*) and (*c*), each of the sub-membrane regions SA1, SA2, SA3 including the mass increasing portion 150 may have the same mass. That is, a total mass per unit area may be the same in the sub-membrane regions SA1, SA2, SA3. Herein, the total mass means the sum of the mass of the membrane 130 and the mass of the mass increasing portion 150. Accordingly, the sub-membrane regions SA1, SA2, SA3 may have the same resonant frequency.

Accordingly, the structure of the multiple rings is first manufactured by setting the second width W2 and the first thickness T1 of the slits 113 and rigidity and mass of the membrane 130 based on the operation frequency of the incident ultrasonic wave and the wavelength of the ultrasonic wave in a medium. Thereafter, the operation frequency of the ultrasonic wave transmission structure 100 may be adjusted depending upon addition of the mass increasing portion 150 to each of the sub-membrane regions SA1, SA2, SA3. That is, the operation frequency of the ultrasonic wave transmission structure 100 may be easily set depending upon installation conditions of the mass increasing portion 150.

FIG. 5 is an exemplary plan view of modification of the mass increasing portion of the ultrasonic wave transmission structure according to the first embodiment of the present invention.

Referring to FIG. 5, the mass increasing portion 150 may be provided to the membrane such that each of the sub-membrane regions SA1, SA2, SA3 has a different mass from other sub-membrane regions. That is, the total mass per unit area may be different in the sub-membrane regions SA1, SA2, SA3. Accordingly, each of the sub-membrane regions SA1, SA2, SA3 may have a different resonant frequency.

Here, in each of the sub-membrane regions SA1, SA2, SA3, the total mass per area may be sequentially changed from the center of the ultrasonic wave transmission structure 100. That is, the total mass per area may be sequentially increased from the sub-membrane region SA1 disposed at the center of the transmission structure to the sub-membrane region SA3 disposed at a periphery thereof. Alternatively, the total mass per area may be sequentially decreased from the sub-membrane region SA1 disposed at the center of the transmission structure to the sub-membrane region SA3 disposed at the periphery thereof.

For example, as shown in FIG. 5 (*a*), for the ultrasonic wave transmission structure 100 including the loop-shaped mass increasing portion 150A, the total mass per area in each of the sub-membrane regions SA1, SA2, SA3 may be sequentially decreased from the center of the ultrasonic wave transmission structure to the periphery thereof by gradually decreasing the width of the mass increasing portion 150A from the sub-membrane region SA1 disposed at the center of the ultrasonic wave transmission structure to the sub-membrane region SA3 disposed at the periphery thereof.

In addition, as shown in FIG. 5 (*b*), for the ultrasonic wave transmission structure 100 including the spot-shaped mass increasing portion 150B, the total mass per area in each of the sub-membrane regions SA1, SA2, SA3 may be sequentially decreased from the center of the ultrasonic wave transmission structure to the periphery thereof by gradually increasing an interval between the mass increasing portions 150B from the sub-membrane region SA1 disposed at the center of the ultrasonic wave transmission structure to the sub-membrane region SA3 disposed at the periphery thereof.

Although not shown in the drawings, for the ultrasonic wave transmission structure 100 including the spot-shaped mass increasing portion 150B, the total mass per area in each of the sub-membrane regions SA1, SA2, SA3 may be sequentially decreased from the center of the ultrasonic wave transmission structure to the periphery thereof by gradually decreasing the diameter of the mass increasing portion 150B from the sub-membrane region SA1 disposed at the center of the ultrasonic wave transmission structure to the sub-membrane region SA3 disposed at the periphery thereof.

As such, the resonant frequency in each of the sub-membrane regions SA1, SA2, SA3 may be sequentially adjusted by sequentially adjusting the total mass per area in each of the sub-membrane regions SA1, SA2, SA3 from the center of the multiple rings 110 to the periphery thereof.

FIG. 6 is an exemplary view illustrating a focusing principle of the ultrasonic wave transmission structure according to the first embodiment, showing a focusing shape of an ultrasonic wave radiated from the ultrasonic wave transmission structure of FIG. 5, which is applied to an ultrasonic transducer.

That is, as shown in FIG. 6, a phase of the ultrasonic wave passing through each of the sub-membrane regions SA1, SA2, SA3, SA4 may be adjusted by sequentially adjusting the resonant frequency in each of the sub-membrane regions SA1, SA2, SA3, SA4, thereby enabling focusing of the radiated ultrasonic wave.

In addition, in ultrasonic examination, since a target point of a subject is generally present at various depths from the surface of the subject, it is necessary to make the focus of the ultrasonic wave coincident with the target point of the subject. That is, there is a need to shift a focusing distance FL corresponding to a distance at which the ultrasonic wave radiated from ultrasonic wave transmission structure is focused.

According to the present invention, the focusing distance and diameter of the radiated ultrasonic wave may be freely realized and adjusted by adjusting a total mass difference corresponding to a difference between the total mass in the sub-membrane region disposed at the center of the ultrasonic wave transmission structure 100 and the total mass in the sub-membrane region disposed at the periphery thereof.

For example, when the total mass difference corresponding to the difference between the total mass in the sub-membrane region SA1 at the center of the ultrasonic wave transmission structure and the total mass in the sub-membrane region SA4 at the periphery thereof is set to a large value, the focusing distance FL of the ultrasonic wave may be decreased, and when the total mass difference is set to a small value, the focusing distance FL of the ultrasonic wave may be increased.

The total mass per area in each of the sub-membrane regions SA1, SA2, SA3, SA4 for focusing of the ultrasonic wave and the difference in total mass between the sub-membrane regions SA1, SA2, SA3, SA4 may be calculated based on the wavelength of the ultrasonic wave in a medium set according to the focusing distance FL and the operation frequency of the ultrasonic wave.

Next, an ultrasonic wave transmission structure according to a second embodiment of the present invention will be described.

FIG. 7 is an exemplary plane view of an ultrasonic wave transmission structure according to a second embodiment of the present invention.

Referring to FIG. 7, the ultrasonic wave transmission structure 200 according to the second embodiment may include multiple rings 210, a membrane 230, and a mass decreasing portion 250.

In the ultrasonic wave transmission structure 200 according to the second embodiment, the multiple rings 210 and the membrane 230 may have the same structures as the multiple rings 110 and the membrane 130 of the ultrasonic wave transmission structure 100 according to the first embodiment, and the mass decreasing portion 250 has a different structure than the mass increasing portion 150 of the ultrasonic wave transmission structure 100 according to the first embodiment. The following description will focus on the mass decreasing portion 250 of the ultrasonic wave transmission structure according to the second embodiment.

According to the second embodiment, the mass decreasing portion 250 serves to decrease the mass of the membrane 230 and may be disposed in regions of the membrane 230 adjoining the slits 213. That is, the mass decreasing portion 250 may be disposed in each of the sub-membrane regions SA1, SA2, SA3.

The mass decreasing portion 250 may be a hole formed through the membrane 230. The hole may be formed in a circular shape, a polygonal shape, or an arbitrary shape.

The mass decreasing portion 250 may be disposed in plural in a circumferential direction of each of the sub-membrane regions SA1, SA2, SA3 so as to be separated a preset distance from each other in the circumferential direction of the sub-membrane regions SA1, SA2, SA3.

In addition, the mass decreasing portion 250 may be disposed on a central line in the radial direction of each of the sub-membrane regions SA1, SA2, SA3. Alternatively, although not shown in the drawings, the mass decreasing portion 250 may be provided in plural in the radial direction of each of the sub-membrane regions SA1, SA2, SA3 so as to be separated a preset distance from each other in the radial direction of each of the sub-membrane regions SA1, SA2, SA3.

By the mass decreasing portion 250, the mass of each of the sub-membrane regions SA1, SA2, SA3 may be changed (decreased). As a result, the resonant frequency in each of the sub-membrane regions SA1, SA2, SA3 may be changed.

Each of the sub-membrane regions SA1, SA2, SA3 including the mass decreasing portion 250 may have the same mass. That is, a total mass per unit area may be a value obtained by subtracting a mass, which is removed by the mass decreasing portion 250, from a mass of the membrane 230 excluding the mass decreasing portion 250. Accordingly, the sub-membrane regions SA1, SA2, SA3 may have the same resonant frequency.

Accordingly, the ultrasonic wave transmission structure is manufactured by setting the second width W2 and the first thickness T1 of the slits and rigidity and mass of the membrane 230 based on an operation frequency of an incident ultrasonic wave and a wavelength of the ultrasonic wave in a medium. Thereafter, the operation frequency of the ultrasonic wave transmission structure 200 may be adjusted depending upon the presence of the mass decreasing portion 250 in each of the sub-membrane regions SA1, SA2, SA3. That is, the operation frequency of the ultrasonic wave transmission structure 200 may be easily set depending upon installation conditions of the mass decreasing portion 250.

FIG. 8 is an exemplary plan view of modification of the mass decreasing portion of the ultrasonic wave transmission structure according to the second embodiment of the present invention.

Referring to FIG. 8, the mass decreasing portion 250 may be provided on the membrane such that each of the sub-membrane regions SA1, SA2, SA3 has a different mass from other sub-membrane regions. That is, the total mass per unit area may be different in the sub-membrane regions SA1, SA2, SA3. Accordingly, each of the sub-membrane regions SA1, SA2, SA3 may have a different resonant frequency.

Here, in each of the sub-membrane regions SA1, SA2, SA3, the total mass per area may be sequentially changed from the center of the ultrasonic wave transmission structure 200. That is, the total mass per area may be sequentially increased from the sub-membrane region SA1 disposed at the center of the transmission structure to the sub-membrane region SA3 disposed at the periphery thereof. Alternatively, the total mass per area may be sequentially decreased from the sub-membrane region SA1 disposed at the center of the transmission structure to the sub-membrane region SA3 disposed at the periphery thereof.

For example, as shown in FIG. 8 (*a*), the total mass per area in each of the sub-membrane regions SA1, SA2, SA3 may be sequentially decreased from the center of the ultrasonic wave transmission structure to the periphery thereof by gradually increasing the diameter of the mass decreasing portion 250A from the sub-membrane region SA1 disposed at the center of the ultrasonic wave transmission structure to the sub-membrane region SA3 disposed at the periphery thereof.

In addition, as shown in FIG. 8 (*b*), the total mass per area in each of the sub-membrane regions SA1, SA2, SA3 may be sequentially decreased from the center of the ultrasonic wave transmission structure to the periphery thereof by gradually decreasing an interval between the mass decreasing portions 250B from the sub-membrane region SA1 disposed at the center of the ultrasonic wave transmission structure to the sub-membrane region SA3 disposed at the periphery thereof.

In this way, the resonant frequency in each of the sub-membrane regions SA1, SA2, SA3 may be sequentially adjusted by sequentially adjusting the total mass per area in each of the sub-membrane regions SA1, SA2, SA3 from the center of the multiple rings 110 to the periphery thereof.

FIG. 9 is an exemplary view illustrating a focusing principle of the ultrasonic wave transmission structure according to the second embodiment, showing a focusing shape of an ultrasonic wave radiated from the ultrasonic wave transmission structure of FIG. 8, which is applied to an ultrasonic transducer.

As shown in FIG. 9, a phase of the ultrasonic wave passing through each of the sub-membrane regions SA1, SA2, SA3, SA4 may be adjusted by sequentially adjusting the resonant frequency in each of the sub-membrane regions SA1, SA2, SA3, SA4, thereby enabling focusing of the radiated ultrasonic wave.

In addition, the focusing distance and diameter of the radiated ultrasonic wave may be freely realized and adjusted by adjusting a total mass difference corresponding to a difference between the total mass in the sub-membrane region disposed at the center of the ultrasonic wave transmission structure and the total mass in the sub-membrane region disposed at the periphery thereof.

For example, when the total mass difference corresponding to the difference between the total mass in the sub-membrane region SA1 at the center of the ultrasonic wave transmission structure and the total mass in the sub-membrane region SA4 at the periphery thereof is set to a large value, the focusing distance FL of the ultrasonic wave may be decreased, and when the total mass difference is set to a small value, the focusing distance FL of the ultrasonic wave may be increased.

Next, an ultrasonic wave transmission structure according to a third embodiment of the present invention will be described.

FIG. 10 is an exemplary plane view of an ultrasonic wave transmission structure according to a third embodiment of the present invention.

Referring to FIG. 10, the ultrasonic wave transmission structure 300 according to the third embodiment may include multiple rings 310 and a membrane 330.

In the ultrasonic wave transmission structure 300 according to the third embodiment, the multiple rings 310 may have the same structure as the multiple rings 110; 210 of the ultrasonic wave transmission structures 100; 200 according to the first and second embodiments and the mass increasing portions 150; 250 according to the first and second embodiments are not used. Further, the membrane 330 of the ultrasonic wave transmission structure 300 according to the third embodiment has a different structure than the membranes of the ultrasonic wave transmission structures according to the first and second embodiments. The following description will focus on the membrane 330 of the ultrasonic wave transmission structure according to the third embodiment.

According to the third embodiment, the membrane 330 may have a variable thickness. That is, the sub-membrane regions SA1, SA2, SA3, SA4 may have different thicknesses t1, t2, t3, t4. As a result, the membrane 330 may have a different mass per area in each of the sub-membrane regions SA1, SA2, SA3, SA4, whereby each of the sub-membrane regions SA1, SA2, SA3, SA4 can have a different resonant frequency.

Here, thicknesses t1, t2, t3, t4 of the sub-membrane regions SA1, SA2, SA3, SA4 may be sequentially changed from the center of the ultrasonic wave transmission structure 300. That is, the thicknesses t1, t2, t3, t4 may be sequentially increased ($t1<t2<t3<t4$) from the sub-membrane region SA1 disposed at the center of the of the ultrasonic wave transmission structure to the sub-membrane region SA4 disposed at a periphery thereof. Alternatively, the thicknesses t1, t2, t3, t4 may be sequentially decreased ($t1>t2>t3>t4$) from the sub-membrane region SA1 disposed at the center of the ultrasonic wave transmission structure to the sub-membrane region SA4 disposed at the periphery thereof.

For example, as shown in the drawings, the thicknesses t1, t2, t3, t4 may be sequentially increased ($t1>t2>t3>t4$) from the sub-membrane region SA1 disposed at the center of the ultrasonic wave transmission structure to the sub-membrane region SA4 disposed at the periphery thereof, whereby the mass of each of the sub-membrane regions SA1, SA2, SA3, SA4 can be sequentially decreased from the center of the ultrasonic wave transmission structure to the periphery thereof. Accordingly, as shown in FIG. 6 and FIG. 9, the resonant frequency in each of the sub-membrane regions SA1, SA2, SA3, SA4 may be sequentially adjusted and a phase of the ultrasonic wave passing through each of the sub-membrane regions SA1, SA2, SA3, SA4 may be sequentially adjusted, thereby enabling focusing of the radiated ultrasonic wave.

Further, the focusing distance and diameter of the radiated ultrasonic wave may be freely realized and adjusted by adjusting a difference in thickness between the sub-membrane region at the center of the ultrasonic wave transmission structure and the sub-membrane region at the periphery thereof.

For example, when the thickness difference between the sub-membrane region SA1 at the center of the ultrasonic wave transmission structure and the sub-membrane region SA4 at the periphery thereof is set to a large value, the focusing distance of the ultrasonic wave may be decreased, and when the thickness difference is set to a small value, the focusing distance of the ultrasonic wave may be increased.

The thickness of each of the sub-membrane regions SA1, SA2, SA3, SA4 for focusing of the ultrasonic wave and the thickness difference between the sub-membrane regions SA1, SA2, SA3, SA4 may be calculated based on the wavelength of the ultrasonic wave in a medium set according to the focusing distance and the operation frequency of the ultrasonic wave.

The ultrasonic wave transmission structure according to the present invention may be integrally formed with an ultrasonic transducer or may be manufactured as a separate structure to be assembled with the ultrasonic transducer. When the ultrasonic wave transmission structure according to the present invention is manufactured as a separate structure, the ultrasonic wave transmission structure may be detachably coupled to a commercially available ultrasonic transducer. As such, the ultrasonic wave transmission structure according to the present invention has good compatibility with ultrasonic transducers having various operation frequencies.

The ultrasonic wave transmission structure according to the present invention can transmit or receive high power ultrasonic waves without changing specifications of an existing ultrasonic transducer, thereby realizing a high power transducer assembly.

The ultrasonic wave transmission structure according to the present invention can improve output power through amplification of ultrasonic waves radiated from or received by the ultrasonic transducer to increase the intensity of the radiated or received ultrasonic signal pulses.

The ultrasonic wave transmission structure according to the present invention can facilitate not only design of a membrane resonator structure so as to have a resonant frequency coincident with an operation frequency of incident ultrasonic waves, but also design of a target resonant frequency through change in mass of a membrane.

The ultrasonic wave transmission structure according to the present invention allows the focusing distance and diameter of radiated ultrasonic waves to be freely adjusted in various ways through change in mass of the membrane.

Although exemplary embodiments have been described herein, it should be understood that these embodiments are provided for illustration only and are not to be construed in any way as limiting the present invention, and that various modifications, changes, or alterations can be made by those skilled in the art without departing from the spirit and scope of the present invention.

INDUSTRIAL APPLICABILITY

The present invention has industrial applicability in the field of ultrasonic wave technology for improving output power through amplification of ultrasonic waves radiated from or received by an ultrasonic transducer.

The invention claimed is:

1. An ultrasonic wave transmission structure adapted to radiate an ultrasonic wave through amplification of an incident ultrasonic wave, the ultrasonic wave transmission structure comprising:

multiple rings each provided with a body portion having a different radius from other body portions and spaced apart from another body portion adjacent thereto and a slit disposed between adjacent body portions;

a membrane disposed in the multiple rings; and a mass increasing portion coupled to a membrane region adjoining the slit to increase a mass of the membrane, wherein a resonant frequency of the membrane is changed by changing a total mass of the membrane and the mass increasing portion.

2. The ultrasonic wave transmission structure according to claim 1, wherein the mass increasing portion is disposed in a loop shape corresponding to a shape of the ring or disposed in a circular shape or a polygonal shape.

3. The ultrasonic wave transmission structure according to claim 1, wherein a membrane region adjoining the slit is divided into multiple sub-membrane regions depending upon a distance from a center of the multiple rings and the total mass per area is the same in the sub-membrane regions.

4. The ultrasonic wave transmission structure according to claim 1, wherein a membrane region adjoining the slit is divided into multiple sub-membrane regions depending upon a distance from a center of the multiple rings and the total mass per area in the sub-membrane regions is sequentially changed from the center of the multiple rings.

5. The ultrasonic wave transmission structure according to claim 4, wherein a focusing distance of radiated ultrasonic waves is adjusted by adjusting a total mass difference corresponding to a difference between the total mass in a sub-membrane region disposed at the center of the multiple rings and the total mass in a sub-membrane region disposed at a periphery of the multiple rings.

6. The ultrasonic wave transmission structure according to claim 5, wherein the focusing distance is decreased when the total mass difference is relatively large and the focusing distance is increased when the total mass difference is relatively small.

7. An ultrasonic wave transmission structure adapted to radiate an ultrasonic wave through amplification of an incident ultrasonic wave, the ultrasonic wave transmission structure comprising:

multiple rings each provided with a body portion having a different radius from other body portions and spaced apart from another body portion adjacent thereto and a slit disposed between adjacent body portions;

a membrane disposed in the multiple rings; and a mass decreasing portion formed in a membrane region adjoining the slit to decrease a mass of the membrane, wherein a resonant frequency of the membrane is changed by changing a total mass of the membrane and the mass decreasing portion.

8. The ultrasonic wave transmission structure according to claim 7, wherein the mass decreasing portion is disposed in a hole shape penetrating the membrane.

9. The ultrasonic wave transmission structure according to claim 7, wherein a membrane region adjoining the slit is divided into multiple sub-membrane regions depending upon a distance from a center of the multiple rings and the total mass per area is the same in the sub-membrane regions.

10. The ultrasonic wave transmission structure according to claim 7, wherein a membrane region adjoining the slit is divided into multiple sub-membrane regions depending upon a distance from a center of the multiple rings and the total mass per area in the sub-membrane regions is sequentially changed from the center of the multiple rings.

11. The ultrasonic wave transmission structure according to claim 10, wherein a focusing distance of radiated ultrasonic waves is adjusted by adjusting a total mass difference corresponding to a difference between the total mass in a sub-membrane region disposed at the center of the multiple rings and the total mass in a sub-membrane region disposed at a periphery of the multiple rings.

12. The ultrasonic wave transmission structure according to claim 11, wherein the focusing distance is decreased when the total mass difference is relatively large and the focusing distance is increased when the total mass difference is relatively small.

13. An ultrasonic wave transmission structure adapted to radiate an ultrasonic wave through amplification of an incident ultrasonic wave, the ultrasonic wave transmission structure comprising:

multiple rings each provided with a body portion having a different radius from other body portions and spaced apart from another body portion adjacent thereto and a slit disposed between adjacent body portions; and a membrane disposed in the multiple rings, wherein a membrane region adjoining the slit is divided into multiple sub-membrane regions depending upon a distance from a center of the multiple rings and a resonant frequency in the sub-membrane regions is changed by changing thicknesses of the sub-membrane regions depending upon the distance from the center of the multiple rings.

14. The ultrasonic wave transmission structure according to claim 13, wherein the sub-membrane regions are formed to thicknesses sequentially changed from the center of the multiple rings.

15. The ultrasonic wave transmission structure according to claim 14, wherein a focusing distance of radiated ultrasonic waves is adjusted by adjusting a thickness difference corresponding to a difference in thickness between a sub-membrane region disposed at the center of the multiple rings and a sub-membrane region disposed at a periphery of the multiple rings.

16. The ultrasonic wave transmission structure according to claim 15, wherein the focusing distance is decreased when the thickness difference is relatively large and the focusing distance is increased when the thickness difference is relatively small.

* * * * *